US007935329B2

(12) United States Patent
Im et al.

(10) Patent No.: US 7,935,329 B2
(45) Date of Patent: May 3, 2011

(54) TITANIA SOL, METHOD OF PREPARING THE SAME, AND COATING COMPOSITION COMPRISING THE SAME

(75) Inventors: Sang-Hyuk Im, Daejeon (KR);
Seung-Heon Lee, Daejeon (KR);
Young-Jun Hong, Daejeon (KR);
Won-Yong Choi, Pohang (KR)

(73) Assignee: LG Chem, Ltd., Seoul (KR)

( * ) Notice: Subject to any disclaimer, the term of this patent is extended or adjusted under 35 U.S.C. 154(b) by 352 days.

(21) Appl. No.: 11/606,294

(22) Filed: Nov. 30, 2006

(65) Prior Publication Data

US 2007/0151482 A1    Jul. 5, 2007

(30) Foreign Application Priority Data

Dec. 20, 2005  (KR) .................. 10-2005-0126113
Oct. 18, 2006  (KR) .................. 10-2006-0101250

(51) Int. Cl.
*C01G 23/047* (2006.01)
(52) U.S. Cl. ........ 423/610; 423/611; 423/612; 423/616; 977/773; 977/775; 977/776
(58) Field of Classification Search .......... 423/610–616; 106/436, 437; 977/773, 775, 776
See application file for complete search history.

(56) References Cited

U.S. PATENT DOCUMENTS

| 5,840,111 | A    |   | 11/1998 | Wiederhoft et al. |           |
|-----------|------|---|---------|-------------------|-----------|
| 6,803,077 | B2   | * | 10/2004 | Yu                | 427/376.2 |
| 7,144,840 | B2   | * | 12/2006 | Yeung et al.      | 502/350   |
| 2002/0005145 | A1 |   | 1/2002  | Sherman           |           |
| 2005/0013766 | A1 | * | 1/2005  | Imura et al.      | 423/610   |
| 2006/0024228 | A1 | * | 2/2006  | Liang et al.      | 423/610   |
| 2006/0104894 | A1 | * | 5/2006  | Daoud et al.      | 423/610   |
| 2006/0281087 | A1 | * | 12/2006 | Sonezaki et al.   | 435/6     |
| 2007/0119344 | A1 | * | 5/2007  | Yeung et al.      | 106/287.34 |

FOREIGN PATENT DOCUMENTS

| CN | 1623653         |   | 6/2005  |
|----|-----------------|---|---------|
| KR | 10-2001-0028286 |   | 4/2001  |
| KR | 10-2002-0043133 |   | 6/2002  |
| KR | 10-2004-0100932 |   | 12/2004 |
| WO | WO 2004087765 A1 | * | 10/2004 |

OTHER PUBLICATIONS

Nam et al., "A Photocatalytic Performance of TiO2 Photocatalyst Prepared by the Hydrothermal Method", Korean Journal of Chemical Engineering, 20(1), 180-184 (2003).*

(Continued)

*Primary Examiner* — Stanley Silverman
*Assistant Examiner* — Anthony J Zimmer
(74) *Attorney, Agent, or Firm* — McKenna Long & Aldridge LLP

(57) ABSTRACT

The present invention relates to a titania sol, a method of preparing the same, and a coating composition including the same. More specifically, it relates to a titania sol prepared by elevating the temperature of a reactant solution including a precursor of titania in a solvent for a reaction temperature, adding an acid catalyst to the reactant solution and conducting a sol-gel reaction while removing the solvent for reaction therefrom, and drying the prepared titania sol and re-dispersing the dried titania in a solvent for dispersion, a method of preparing the same, and a coating composition including the same.

10 Claims, 5 Drawing Sheets

OTHER PUBLICATIONS

Watson et al., "The effect of preparation method on the photoactivity of crystalline titanium dioxide particles", Chemical Engineering Journal 95 (2003), 213-220.*

Yang et al., "Reversible chemisorption of nitric oxide in the presence of oxygen on titania and titania modified with surface sulfate", Applied Catalysis A: General (1998) 215-222.*

* cited by examiner

TITANIA SOL, METHOD OF PREPARING THE SAME, AND COATING COMPOSITION COMPRISING THE SAME

CROSS REFERENCES TO RELATED APPLICATION

This application claims priority to and the benefit of Korean Patent Application Nos. 10-2005-0126113 filed on Dec. 20, 2005, and 10-2006-0101250 filed on Oct. 18, 2006 in the Korean Industrial Property Office, both of which are hereby incorporated by reference for all purposes as if fully set forth herein.

BACKGROUND OF THE INVENTION (a) Field of the Invention

The present invention relates to a titania sol, a method of preparing the same, and a coating composition including the same, and more specifically to a titania sol that can be directly used as a middle or high refractive filler on glasses, industrial safety glasses, or goggles for leisure that require transparency, so as to prepare a coating layer easily, a method of preparing the same, and a composition for coating including the same.

(b) Description of the Related Art

Titania has the highest refractive index among metal oxides, and it is excellent in terms of whiteness and dyeability. Furthermore, titania can be dispersed in a solution with a relatively accurate particle size. Therefore, it is used in various fields such as for an electronic material, a Braun tube of a TV, a coating material for a welding rod, etc., as well as for paint, ink, plastic, paper, a filler for controlling gloss of rubber and fiber, and to enhance durability of chemical fibers and synthetic fibers.

Generally, titania is classified as anatase and rutile according to its crystal form. The anatase and the rutile show different physical properties owing to their different crystal structures. Specifically, the refractive index of the rutile titania, which is 2.72, is higher than the refractive index of the anatase titania, which is 2.52, and it is difficult to make it into a spherical form of a several-nanometer size.

The typical application of the titania to the various coating layers is done by dry coating method including deposition and wet coating using a coating solution. The coating solution for wet coating is prepared in the form of titania sol wherein titania is dispersed homogeneously in a solvent. However, as known, it is difficult to make the titania into a sol because the titania is chemically stable and poorly soluble to an acid, an alkali, water, or an organic solvent, except for fluoric acid, heated concentrated sulfuric acid, and a molten alkali salt. Furthermore, there are many difficulties in preparing a hard coating composition, because the titania does not react with a high reactive gas such as sulfur trioxide ($SO_3$), chlorine gas, etc., under normal temperature and normal pressure.

Therefore, methods of preparing the titania sol through sol-gel reaction have been suggested to have more stable dispersity and ease of application to a coating composition. The sol-gel reaction has a merit such that the titania sol is easily prepared by hydrolysis reaction of a metal halide or an alkoxide.

Korean Patent Publication No. 2001-0028286 discloses a method of preparing the water-dispersed titania sol by sol-gel reaction under normal pressure. The titania sol may be applied to a coating layer, but the solid content is too low to be used as a filler for a high refractive hard coating layer. Furthermore, when the water is removed in order to increase the solid content, there are some problems that aggregations of the particles occur and the particles are enlarged.

Korean Patent Publication No. 2004-0100732 discloses a method of preparing the titania particles by sol-gel reaction under high pressure. It is possible to produce stably dispersed titania nanoparticles by the method. However, it is undesirable to be applied to a real process, because the sol-gel reaction is conducted under a relatively high temperature and pressure, aggregations of the particles occur when re-dispersing them into a solvent after drying the prepared titania nanoparticles, and the solid content must be low in order to make a stable sol.

Korean Patent Publication No. 2002-0043133 discloses a method of preparing highly crystalline and dispersive photocatalyst of an anatase-type titania sol by hydrothermal treatment. Although the solid content of the titania sol prepared therefrom is relatively high, approaching 10 wt %, the publication mentions that precipitation and gelation occur when the solid content is over the range. Furthermore, although the publication mentions that the solid content may be increased to up to 20 wt % by removing the solvent with distillation under reduced pressure, there is a problem in that the particles are enlarged and aggregations occur.

SUMMARY OF THE INVENTION

It is an aspect of the present invention to provide a titania sol wherein titania particles having an average diameter of 200 nm or less are dispersed in a solvent for dispersion with high concentration.

It is another aspect of the present invention to provide a method of preparing the titania sol.

Still another aspect of the present invention is to provide a coating composition that may be applied to a coating layer by directly coating the titania sol as a middle or high refractive filler on glasses, industrial safety glasses, or goggles for leisure, which require transparency.

In order to attain these objects, the present invention provides a method of preparing a titania sol, including the steps of:

a) elevating the temperature of a reactant solution including a precursor of titania in a solvent for reaction to the reaction temperature;

b) preparing a titania sol by adding an acid catalyst to the reactant solution and conducting a sol-gel reaction while removing the solvent for reaction therefrom; and c) drying the prepared titania sol and re-dispersing the dried titania in a solvent for dispersion.

Furthermore, the present invention provides a titania sol prepared by said method, and including secondary titania particles having an average diameter of 200 nm or less.

Furthermore, the present invention provides a coating composition for a middle and high refractive coating layer, including said titania sol in an amount of from 10 to 70 wt %.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

Figure 1:
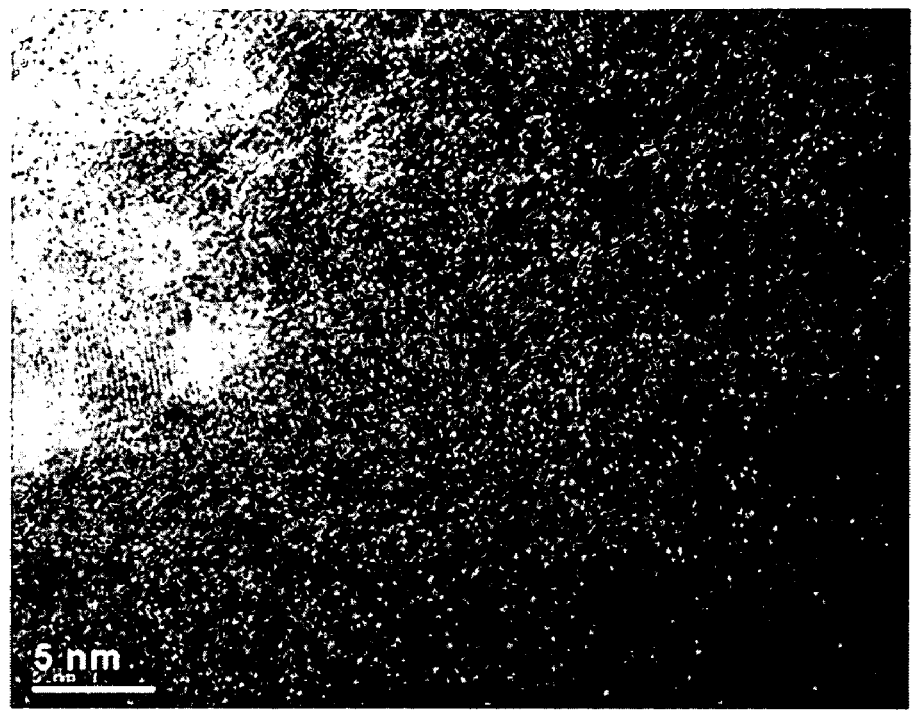
FIG. 1 is a transmission electron microscope (TEM) photograph showing titania particles prepare by Example 1.
Figure 2:
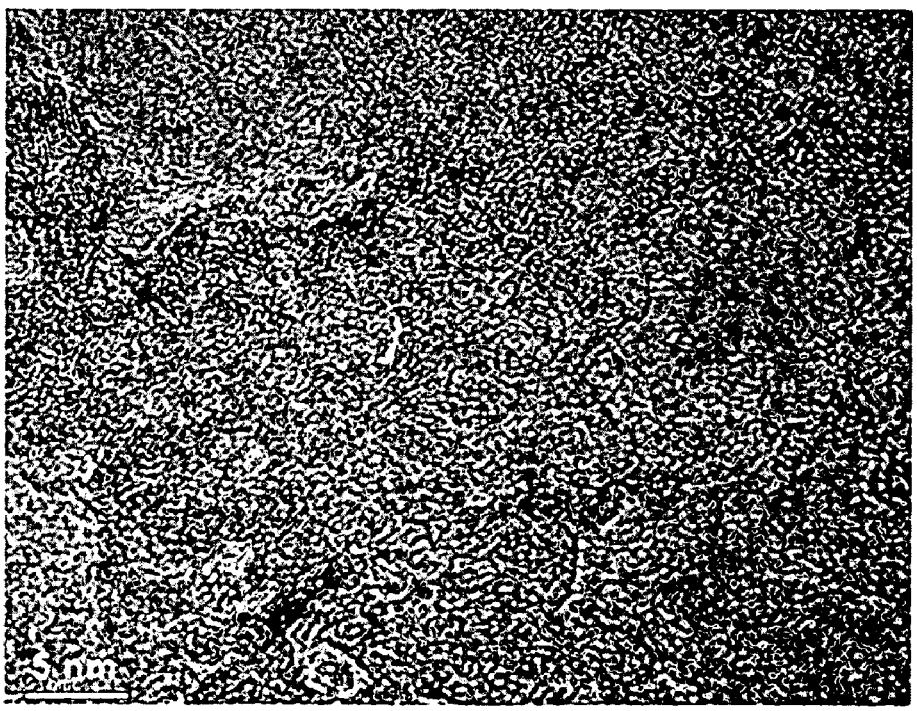
FIG. 2 is a TEM photograph showing titania particles prepared by Example 2.
Figure 3:
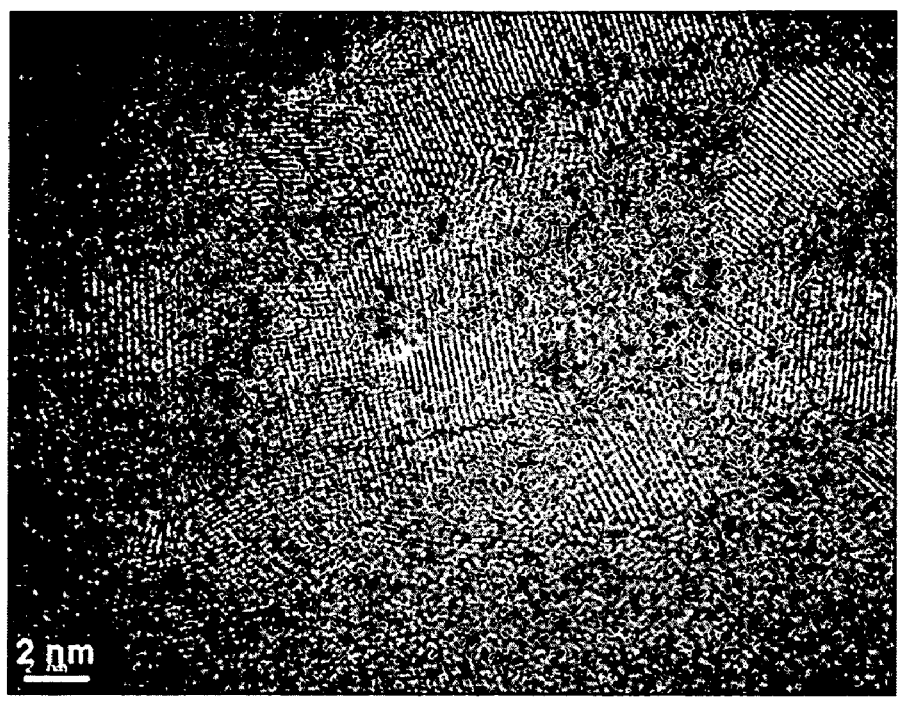
FIG. 3 is a TEM photograph showing titania particles prepared by Example 3.
Figure 4:
FIG. 4 is a TEM photograph showing titania particles prepared by Example 4.

Hereinafter, the present invention is explained in more detail.

As disclosed in the 'Description of the Related Art', a mechanism for preparing titania sol has not been specifically revealed, even though various sol-gel reactions for preparing titania sol have been attempted. However, the physical properties of titania, which is prepared by sol-gel reaction, such as particle size, crystallinity, and dispersion stability are considerably influenced by a kind of alkoxide that is used in the sol-gel reaction, and conditions of the reaction. Specifically, the properties of the particles of the prepared titania sol are considerably influenced by different conditions of the reaction and the order of adding reactants.

Hereinafter, the present invention is explained in more detail.

In the present invention, the term "primary particle" means an independent crystal particle of titania, and the term "secondary particle" means a particle in which two or more "primary particles" are aggregated.

It is characteristic of the present method of preparing titania sol that peptization and crystal growth of a primary titania particle may be controlled by removing a solvent for reaction during a sol-gel reaction at a high temperature.

Furthermore, the secondary titania particle of the titania sol prepared by the method of the present invention has an average diameter of 200 nm or less, and monodispersity of narrow particle distribution. Therefore, it is possible to disperse the particles with high concentration and maintain a stable sol, because there is no aggregation of the secondary titania particles during re-dispersion in a solvent for dispersion.

The preparation of titania sol by sol-gel reaction depends on multiple variables such as pH of reactant solution, temperature and time, concentration of a reagent, characteristics and concentration of catalyst, mole ratio (R) of $H_2O$/metal atom, and drying. Among others, pH, characteristics and concentration of catalyst, relative mole ratio (R) of $H_2O$, and temperature are the most important. Therefore, it is possible to vary the characteristics of titania sol, and the network structure and properties of primary titania particles, covering a wide range, by controlling said conditions.

Hereinafter, the method of preparing titania sol of the present invention is explained step by step.

In step a) of the method, after preparing a reactant solution by injecting a solvent for reaction and a precursor of titania into a reactor, the temperature of the reactor is elevated to a temperature of from 70 to 95° C. to conduct a sol-gel reaction.

At this time, the precursor of titania may be an organic titanium or an inorganic titanium that is commonly used in the related art. Representatively, the organic titanium compound may be tetraethoxy titanium (TEOT), tetraisopropoxy titanium (TIPT), tetrabutoxy titanium (TBOT), or titanium alkoxide.

Furthermore, the inorganic titanium compound may be titanyl chloride ($TiCl_4$), titanyl sulfate ($Ti(SO_4)_2$), titanyl oxysulfate ($TiO(SO_4)$), etc.

The solvent for reaction may be one or more solvents selected from the group consisting of water; a lower alcohol of $C_1$-$C_5$ such as methanol, ethanol, propanol, isopropyl alcohol, butyl alcohol, or isobutyl alcohol; a higher alcohol of $C_6$ or more such as a polyvinyl alcohol; hexylene glycol; and acetyl acetone. Preferably, the solvent may be a mixed solvent of water for hydrolysis and a solvent for dissolving the organic or inorganic titanium compound. More preferably, a mixed solvent of water and one or more solvents except water may be used. At this time, an intense exothermic reaction may occur while the precursor of titania and water are mixed, and thus the precursor of titania and the solvent for reaction are mixed with strong stirring at a low temperature.

After mixing the precursor of titania and the solvent for reaction, the temperature of the reactor is elevated to the sol-gel reaction temperature. The solvent for reaction may be used in an amount of from 400 to 1600 parts by weight based on 100 parts by weight of the precursor of titania.

Furthermore, an inorganic salt or a surfactant may be added to the solvent for reaction to enhance the dispersity of the secondary titania particles included in the titania sol, as necessary. The inorganic salt may include one or more compounds selected from the group consisting of NaCl, KCl, NaBr, and KBr, and the surfactant may include one or more anionic surfactants or cationic surfactants selected from the group consisting of sodium dodecyl sulphate (SDS), cetyltrimethyl ammonium bromide (CTAB), and cetyltrimethyl ammonium chloride (CTAC).

Regarding stability and re-dispersity of the secondary titania particles, the inorganic salt or the surfactant may be added in an amount of from 1 to 10 parts by weight based on 100 parts by weight of the precursor of titania. When the content of the inorganic salt or the surfactant is below 1 part by weight, the effect to dispersion stability and re-dispersity is insignificant, and when the content is over 10 parts by weight, the shape of the prepared secondary titania particle may be changed and the properties of a coating composition prepared therefrom may be deteriorated.

In step b), an acid catalyst is added to the reactant solution including the precursor of titania and the solvent for reaction, and the sol-gel reaction and removing the solvent for reaction are simultaneously conducted.

The content of the acid catalyst may be controlled so that the functional groups of the precursor of titania accept a hydrogen ion primarily and rapidly under an acidic condition, and preferably the acid catalyst may be added in an amount of from 11 to 30 parts by weight, and more preferably from 13 to 25 parts by weight, based on 100 parts by weight of the precursor of titania.

As a result, the electron density around the titania molecule is lowered, the speed of hydrolysis may be increased because the compatibility to the electron increases, and the polymerization reaction occurs because it is easily attacked by a nucleophilic agent and a rapid condensation reaction occurs. This shows that the acid catalyst acts as a peptizing agent causing the polymerization as well as promotes the reaction speed.

In addition to the acid catalyst, a base catalyst may be used. However, it is preferable to use acid catalyst because when the base catalyst is used the gelation time increases. Under acid catalyst condition, it is possible to prepare small primary titania particles because a polymer having a linear or randomly connected branched structure is mainly produced. Under the base catalyst condition, relatively large primary titania particles are produced in comparison to the case of using acid catalyst, because a lump that cannot be penetrated forms a complicatedly entangled structure before forming a gel. Therefore, it is preferable that the acid catalyst is a strong acid, and representatively one or more acid catalysts selected from the group consisting of nitric acid, sulfuric acid, hydrochloric acid, and acetic acid may be used.

At this time, it is preferable that the sol-gel reaction is conducted at a temperature of from 70 to 95° C. for 2 to 24 hours. The reaction temperature influences the crystallinity of the prepared primary titania particles. When the temperature is below 70° C., the crystal does not grow properly, and when the temperature is over 95° C., the re-dispersity is deteriorated and some precipitates are generated after reprocessing such as physical stirring. Therefore, the reaction temperature may be controlled within the above range.

Specifically, the crystallinity of the finally prepared primary titania particle is further increased by removing the solvent in concurrence with the sol-gel reaction.

That is, the peptization and crystal growth of the primary titania particles are caused by adding the acid catalyst, and the primary titania particles are transformed from an amorphous structure into an anatase or rutile crystal form. At this time, if the solvent for reaction is artificially removed from the reactor, the reaction speed of transforming the amorphous structure into a crystal form is increased and thus the primary titania particles having high crystallinity can be prepared. Such increase of the reaction speed is due to "Le Chatellier's Principle" which is "when a system in chemical equilibrium is disturbed by an external action, the system shifts in equilibrium composition in a way that tends to counteract this external action". That is, the present invention controls the crystallinity of the primary titania particles in accordance with controlling the sol-gel reaction by changing the condition by removing the solvent for reaction from the reactor.

The removing of the solvent for reaction is conducted by a heating method or a decompressing method, which are commonly used. In the case of the heating method, the removing of the solvent is proceeded by adjusting the sol-gel reaction temperature to the boiling point of the solvent for reaction, and it can sufficiently proceed at the sol-gel reaction temperature of from 70 to 95° C. Furthermore, in the case of the decompressing method, the solvent is removed by using a conventional decompression device. Such heating and decompressing processes may be simultaneously proceeded to control the crystallinity of the primary titania particles.

In step c), after preparing the secondary titania particles powder by drying the titania particles prepared by the sol-gel reaction, the titania sol is prepared by re-dispersing the secondary titania particles powder into the solvent for dispersion.

The drying of step c) is conducted until the solvent for reaction is sufficiently dried, and the drying method is not particularly limited. However, it is preferable that the drying temperature is 95° C. or less. When the drying temperature is over 95☐, the size of the secondary titania particles is increased and it is difficult to re-disperse the particles in a monodispersed form because of sudden evaporation of the solvent for reaction.

Furthermore, freeze drying, normal pressure drying, or vacuum drying is used in the drying process, and the drying temperature and the drying time may be variously selected and controlled within a range capable of sufficiently drying the solvent, according to the drying method.

However, it is preferable to conduct the drying at 30 to 95° C. in the case of normal pressure drying. When the drying temperature is over 95° C., the crystallinity of the primary titania particle is increased, but the re-dispersity to the solvent for dispersion may be seriously decreased because aggregation of the particles is generated. On the contrary, when the drying temperature is below 30° C., the time for the drying process becomes longer and it is difficult to obtain a monodispersed transparent titania sol because of the unreacted residues. Furthermore, it is preferable to conduct the normal pressure drying for 6 to 72 hours. When the drying time is below 6 hours, it is difficult to obtain a monodispersed transparent titania sol because of the unreacted residues, and when the drying time is over 72 hours, it is difficult to obtain a monodispersed transparent titania sol because of aggregations through the condensation reaction between the titania particles. The drying time may be changed according to the drying conditions, and drying under a lower temperature generally needs more drying time.

Furthermore, the vacuum drying is conducted within a range of temperature in which the solvent of the titania sol-gel product is a liquid, and when the solvent is water, it is preferable that the drying is conducted at a temperature of 0 to 95° C. The vacuum drying time is shorter than that of the conventional normal pressure drying.

Furthermore, the freeze drying is conducted by sublimation within the range of the temperature in which the solvent of the titania sol-gel product is a solid. Specifically, when the solvent is water, it is preferable that the drying is conducted at a temperature of −196 to 0° C. The freeze drying has a merit that the aggregation of the primary particles is prevented, because the dispersion medium existing between the particles is sublimated from a solid state by freeze drying, and thus the aggregation that is caused by a capillary force occurring during evaporation of a liquid solvent is prevented.

The titania sol prepared according to the above steps has a form of sol in which the secondary titania particles are dispersed in the solvent for dispersion, and the average diameter of the secondary titania particles is 200 nm or less, and preferably 2 to 100 nm. Furthermore, the secondary titania particles include two or more primary titania particles having an average diameter of 1 to 20 nm or less, and preferably 5 to 15 nm.

Furthermore, the secondary titania particles of the titania sol show monodispersity of a narrow particle distribution, and the standard deviation of the diameter of the secondary titania particles preferably does not exceeding 0.3, and more preferably does not exceed 0.2.

In particular, the titania sol of the present invention is prepared by dispersing the titania particles prepared by sol-gel reaction into the solvent for dispersion in a solid content of from 8 to 50 wt %. At this time, the concentration of the titania sol of the present invention is very high in consideration of the fact that the solid content of the titania prepared by a common sol-gel reaction is about 5 wt % or less.

The solvent for dispersion may be one or more solvents selected from the group consisting of water; a lower alcohol of $C_1$-$C_5$ such as methanol, ethanol, propanol, isopropyl alcohol, butyl alcohol, or isobutyl alcohol; a higher alcohol of $C_6$ or more such as a polyvinyl alcohol; hexylene glycol; and acetyl acetone. Water may be preferably used.

The coating composition for a middle and high refractive coating layer includes said titania sol in an amount of from 10 to 70 wt %, and an optical coating composition including a conventional siloxane-based resin and a solvent may be applied to the coating composition of the present invention as the other component.

Therefore, the kind of the siloxane-based resin and the solvent are not particularly limited. However, it is preferable that the siloxane-based resin includes one or more compounds selected from the group consisting of an organosilane compound represented by Chemical Formula 1 and an organosilane compound represented by Chemical Formula 2, and one or more solvents selected from the group consisting of methanol, ethanol, isopropanol, n-propanol, n-butanol, sec-butanol, t-butanol, ethyl acetate, methyl acetate, xylene, and toluene may be used as the solvent.

$$R^1_a(SiOR^2)_{4-a} \quad \text{Chemical Formula 1}$$

$$R^3_b Si(OR^4)_{4-b} \quad \text{Chemical Formula 2}$$

wherein $R^1$ and $R^2$ are independently $C_1$-$C_6$ alkyl, $C_1$-$C_6$ alkenyl, $C_1$-$C_6$ halogenated alkyl, allyl, or $C_3$-$C_6$ aromatic group, $R^3$ is

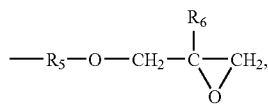

wherein $R^5$ is a $C_1$-$C_4$ alkylene, and $R^6$ is hydrogen, a $C_1$-$C_4$ alkyl, or

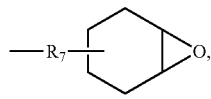

in which $R^7$ is hydrogen, a $C_1$-$C_4$ alkyl, or a $C_1$-$C_4$ alkylene,
$R^4$ is a $C_1$-$C_6$ alkyl,
a is an integer from 0 to 3, and
b is an integer from 0 to 3.

A transparent middle or high refractive coating layer having a refractive index of 1.5 to 1.65 may be prepared from the coating composition by coating the composition on glasses, industrial safety glasses, or goggles for leisure requiring transparency, and then curing it.

The coating method of the composition may be a general wet coating process, and as examples, roll coating, spray coating, dip coating, or spin coating may be used.

The curing condition of the composition may be varied a little according to the mixing ratio and the components, but a coating layer having a desiring hardness may be obtained by curing at a temperature below the softening point of the substrate, and preferably 60 to 150° C. for 20 minutes to several hours.

The coating layer prepared from the coating composition may be dyed by dispersion dyes. In the dyeing process, the conditions such as concentration of the dye, temperature, and time may be freely determined, but it is preferable that the dyeing process is proceeded by dipping the coating layer into 0.1 to 1 weight % of an aqueous dye solution at a temperature of from 80 to 100° C. for 5 to 10 minutes.

The coating layer can obtain various effects because it is prepared by using the titania sol in which the nano-sized secondary titania particles having monodispersity are dispersed in the solvent for dispersion. Namely, it is possible to prepare a highly transparent coating layer because of using the titania sol in which the size of the secondary particle is 200 nm or less, and the transparency of the coating layer may be increased because of the monodispersity of the titania sol. Furthermore, the conventional multi-coating process may be simplified because the titania particles are dispersed in the titania sol with a high concentration. And the properties of the coating layer such as hardness, abrasion resistance, transparency, gloss, dyeability, leveling, etc., may be enhanced and it can be formed thinly.

Hereinafter, the present invention is described in further detail through examples. However, the following examples are only for the understanding of the present invention and the present invention is not limited to or by them.

Example 1

After injecting 1500 g of distilled water as a solvent for reaction in a reactor, 40 g of isopropanol and 240 g of titanium tetraisopropoxide (made by DuPont Inc.) were slowly added therein so as to produce a reactant solution.

The temperature of the reactor was elevated to 80° C., and then 41.7 g of nitric acid (65 wt %) was injected therein and a sol-gel reaction was conducted for 10 hours. At this time, the reaction was conducted under vacuum in order to easily evaporate the distilled water from the reactor.

After the sol-gel reaction was completed, the titania powder was obtained by drying the sol-gel product at 80° C. for 14 hours.

After cooling the temperature of the reactor to room temperature, the titania sol was prepared by injecting 200 g of distilled water into the reactor as a solvent for dispersion.

Example 2

The titania sol was prepared substantially according to the same method as in Example 1, except that the temperature of the reactor was elevated to 85° C.

Example 3

The titania sol was prepared substantially according to the same method as in Example 1, except that the temperature of the reactor was elevated to 90° C.

Example 4

The titania sol was prepared substantially according to the same method as in Example 1, except that the temperature of the reactor was elevated to 95° C.

Example 5

The titania sol was prepared substantially according to the same method as in Example 1, except that 5 g of cetyltrimethyl ammonium bromide was added to the reactant solution as a surfactant.

Example 6

The titania sol was prepared substantially according to the same method as in Example 1, except that 800 g of distilled water was injected into the reactor as a solvent for dispersion.

Example 7

The titania sol was prepared substantially according to the same method as in Example 1, except that 160 g of distilled water was injected into the reactor as a solvent for dispersion.

Comparative Example 1

The titania sol was prepared substantially according to the same method as in Example 1, except that the temperature of the reactor was maintained at 25° C.

Comparative Example 2

The titania sol was prepared substantially according to the same method as in Example 1, except that 24 g of nitric acid was added to the reactor as an acid catalyst.

Comparative Example 3

The titania sol was prepared substantially according to the same method as in Example 1, except that 72 g of nitric acid was added to the reactor as an acid catalyst.

Comparative Example 4

The titania sol was prepared substantially according to the same method as in Example 1, except that the dried titania powder was heat-treated in an oven of 150° C. for 24 hours and re-dispersed in the distilled water.

Comparative Example 5

The titania sol was prepared substantially according to the same method as in Example 1, except that 50 g of distilled water was injected into the reactor as a solvent for dispersion.

Comparative Example 6

The titania sol was prepared substantially according to the same method as in Example 1, except that the solvent for reaction was not removed in the step of sol-gel reaction and the titania sol was directly prepared by heat reflux without conducting the drying and the re-dispersing process.

The prepared titania sol had a solid content of 4 wt %, and the solvent was evaporated at 80° C. until the solid content was 32 wt %.

Experimental Example 1

Transmittance Electron Microscopy

Transmittance electron microscopy (TEM) was used to analyze the size of the primary particles of the titania sol prepared by the Examples and the Comparative Examples, and the measured average diameters of the primary particles are listed in the following Table 1. Furthermore, the TEM pictures showing the titania particles prepared at different temperatures by Examples 1 to 4 are presented in FIGS. 1 to 4.

Referring FIGS. 1 to 4, the primary titania particles prepared by Examples 1 to 4 had an average diameter of 4 to 7 nm, and it can be known that the crystallinity of the primary titania particles increases as the reaction temperature increases.

Experimental Example 2

X-Ray Diffraction Analysis

Figure 5:
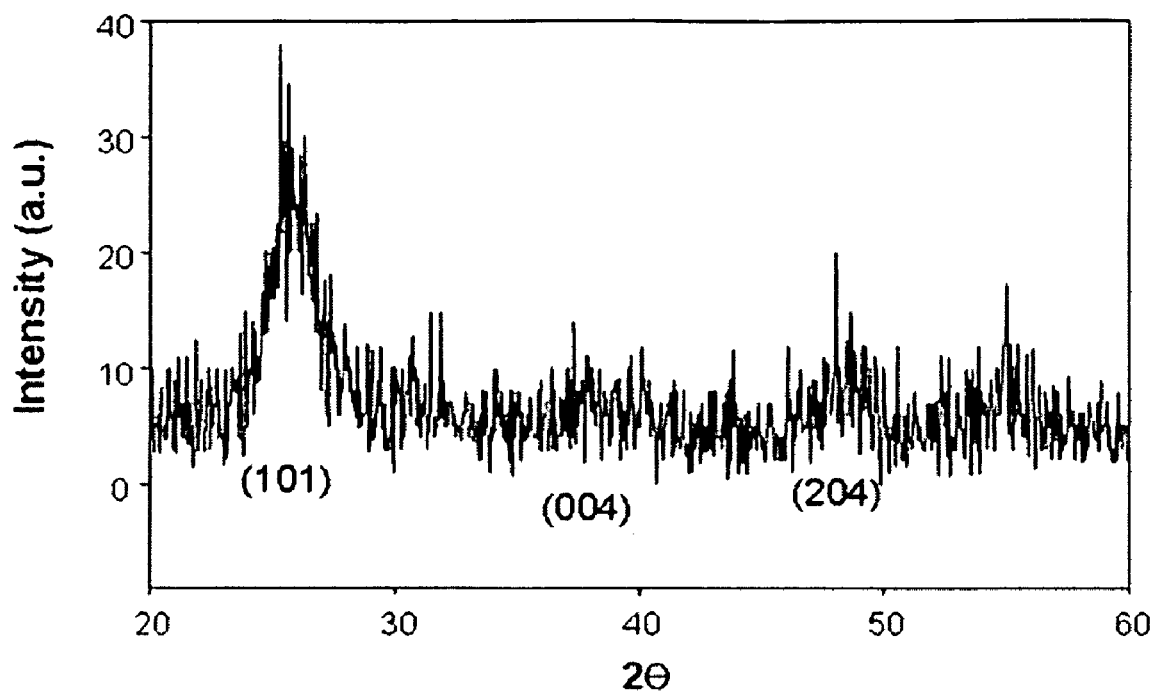
FIG. 5 is an X-ray diffraction graph showing a crystal form of titania prepared by Example 1.

An X-ray diffractometer (XRD) was used to identify the crystallinity and the particle size of the titania prepared by Example 1, and the obtained results are listed in FIG. 5.

FIG. 5 is an X-ray diffraction graph showing a crystal form of titania prepared by Example 1.

Referring to FIG. 5, it can be known that all of the prepared titania have anatase form from the XRD peak position, and the size of the titania calculated by the "Scherrer equation" is below 5 nm which corresponds to the above TEM result of Experimental Example 1.

Experimental Example 3

Particle Size Analysis

The sizes of the secondary titania particle of the titania sol prepared by the Examples and the Comparative Examples were analyzed by using a particle size analyzer, and the obtained results are listed in the following Table 1.

Figure 6:
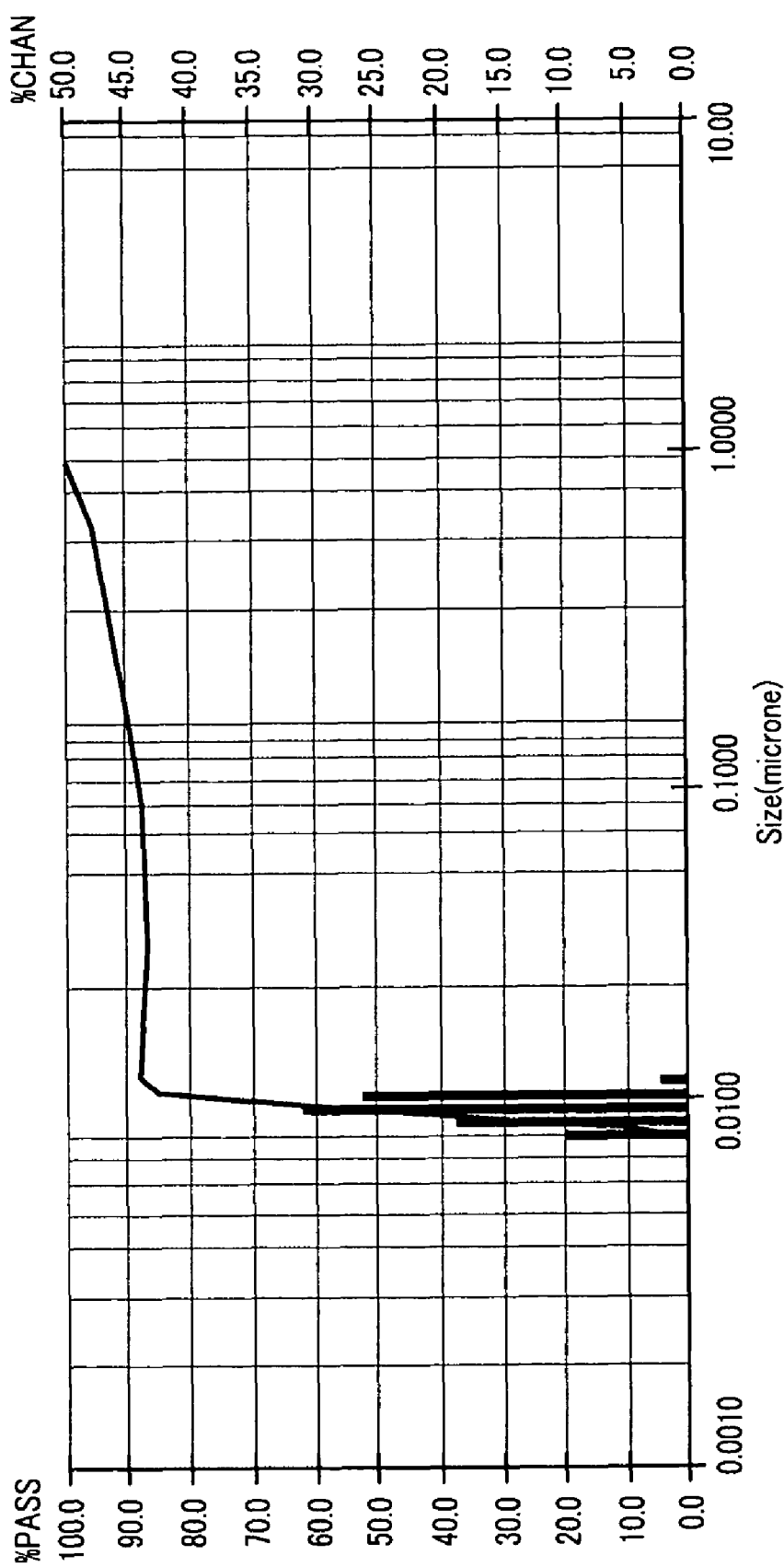
FIG. 6 is a graph showing a distribution of re-dispersed titania sol prepared by Example 1.
Figure 7:
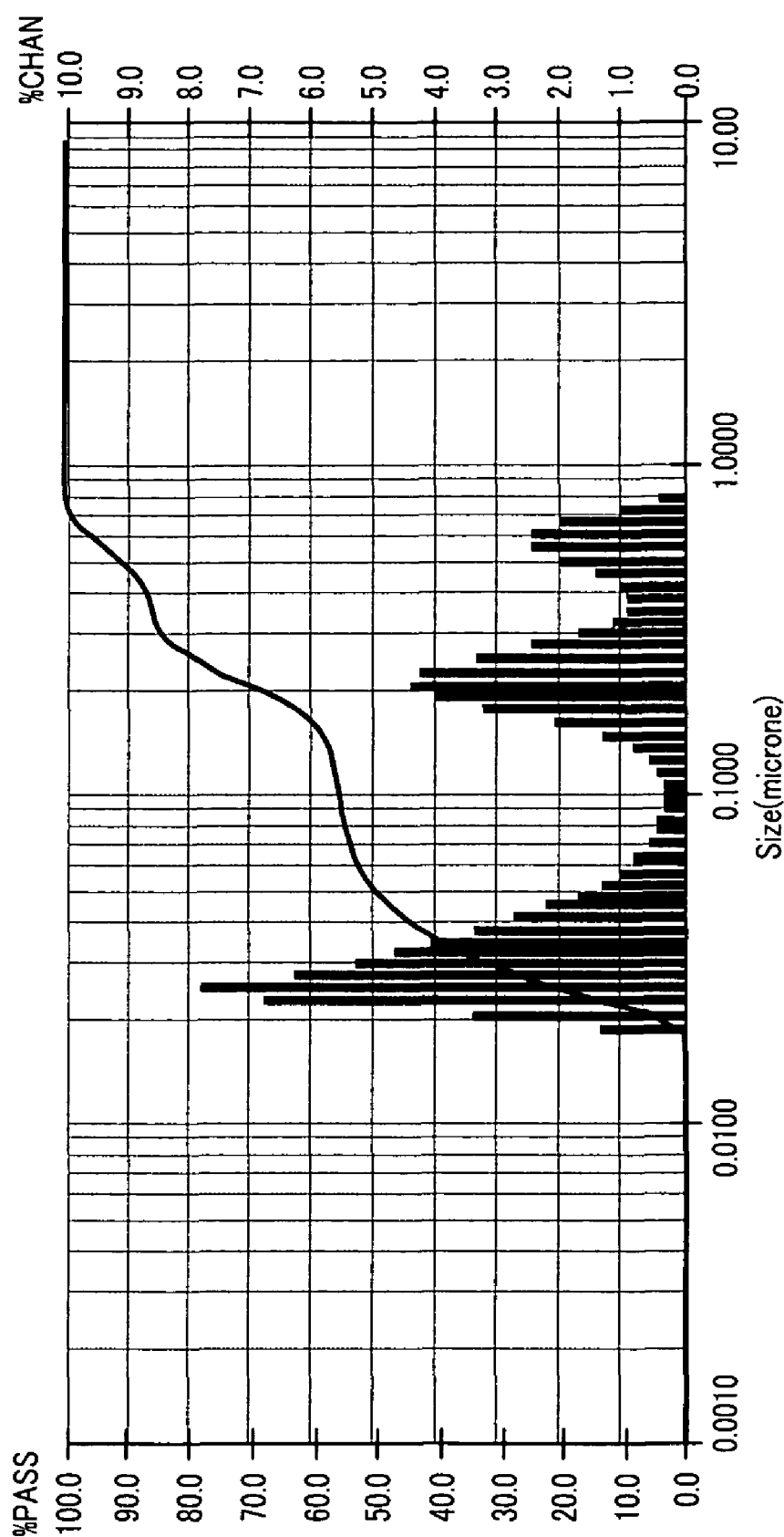
FIG. 7 is a graph showing a distribution of re-dispersed titania sol prepared by Comparative Example 6.

Furthermore, the distribution graphs of the size of the secondary titania particles of the titania sol prepared by Example 1 and Comparative Example 6 are presented in FIGS. 6 and 7.

Referring to FIG. 6, it can be known that the titania sol re-dispersed by the present invention had a particle size of about 10 nm, and has monodispersity because the distribution is very narrow. On the contrary, the titania sol of Comparative Example 6 in which the drying and the re-dispersion were not conducted shows a broad distribution covering a large range, as shown in FIG. 7.

TABLE 1

|  | Solid Content (wt %) | Diameter of the Secondary Particle | | | Diameter of the Primary Particle | | |
| --- | --- | --- | --- | --- | --- | --- | --- |
|  |  | Distribution | Average (nm) | Standard Deviation | Distribution (nm) | Average (nm) | Crystal Form |
| Example 1 | 32 | 9 ± 2 nm | 9 | 0.003 | 4~5 | 4.5 | Anatase |
| Example 2 | 32 | 10 ± 3 nm | 10 | 0.003 | 4.5~5.5 | 5 | Anatase |
| Example 3 | 32 | 12 ± 4 nm | 12 | 0.004 | 5~6 | 5.5 | Anatase |
| Example 4 | 32 | 20 ± 6 nm | 20 | 0.004 | 6~7 | 6.5 | Anatase |
| Example 5 | 32 | 9 ± 2 nm | 9 | 0.003 | 4~5 | 4.5 | Anatase |
| Example 6 | 8 | 9 ± 2 nm | 9 | 0.002 | 4~5 | 4.5 | Anatase |
| Example 7 | 40 | 32 ± 15 nm | 32 | 0.157 | 4~5 | 4.5 | Anatase |
| Comparative Example 1 | 32 | 30 nm~1 mm | — | Polydispersity | 4~10 | 7 | Amorphous |
| Comparative Example 2 | 32 | 10~800 nm | — | Polydispersity | 4~50 | — | Amorphous + Anatase |
| Comparative Example 3 | 32 | 10~500 nm | — | Polydispersity | 2~3 | 2.5 | Anatase |
| Comparative Example 4 | 32 | 10 nm~5 mm | — | Polydispersity | 4~5 | 4.5 | Anatase |

TABLE 1-continued

| | Solid Content (wt %) | Diameter of the Secondary Particle | | | Diameter of the Primary Particle | | Crystal Form |
|---|---|---|---|---|---|---|---|
| | | Distribution | Average (nm) | Standard Deviation | Distribution (nm) | Average (nm) | |
| Comparative Example 5 | 65 | Unmeasurable | Unmeasurable | Unmeasurable | 4~5 | 4.5 | Anatase |
| Comparative Example 6 | 32 | 20~800 nm | 49 | 0.149 | 4~5 | 4.5 | Anatase |

Referring Table 1, it can be known that the titania sols prepared by Examples 1 to 7, in which the average diameter of the primary titania particle are from 4 to 7 nm, have a structure in which the nano-sized titania particles of anatase form are stably dispersed in the solvent for dispersion.

Furthermore, it can be identified that the titania is superior in dispersity and it is dispersed within a very narrow range, even at a high solid content of 32 wt % or more.

On the contrary, in the cases of the titania prepared by Comparative Examples 1 to 6, the re-dispersity severely deteriorates.

In the case of Comparative Example 1, the monodispersed particles cannot be obtained because the peptization processing occurs slowly by conducting the sol-gel reaction, and it can be known that the amorphous primary titania particles are formed because the energy being used to arrange the atoms of the titania is not sufficient.

In the case of Comparative Example 2, the crystallinity was slightly declined and the state of the dispersion was largely deteriorated because the primary titania particles containing water were not completely peptized owing to the insufficient content of the acid catalyst.

On the contrary, in the case of Comparative Example 1, the peptization of the titania containing water occurred very rapidly and smaller particles of the titania were produced by using an excess amount of acid catalyst. However, it can be known that the particles aggregated and the dispersity was largely declined when the particles were re-dispersed after drying because of high surface energy according to the small particle size and instability of the primary titania particle under a strong acidic condition.

In the case of Comparative Example 4, the dispersity was largely declined because the titania particles aggregated by conducting sintering at a high temperature. This means that the monodispersed titania sol cannot be prepared in the case of heat-treating or sintering the amorphous primary titania particle to obtain crystalline titania or in the case of heat-treating or sintering the titania to increase crystallinity.

In the case of Comparative Example 5, it was difficult to re-disperse the secondary titania particles in a monodispersed form, because the distilled water was not sufficient.

Furthermore, in the case of the titania of Comparative Example 6 that was directly prepared without conducting drying and re-dispersion, the solid content was very low at 4 wt %, and it showed slightly lower dispersity. When the solid content was raised to 32 wt % by drying the solvent, it showed polydispersity because of aggregation of the titania particles.

Example 8

The coating composition was prepared by using the titania sol prepared by Example 1.

First, 50 g of tetraethyl orthosilicate, 250 g of 3-glycidyloxypropyl trimethoxysilane, and 100 g of methanol were introduced into a jacket reactor maintaining room temperature. After adding 260 g of the titania sol (solid content: 32 wt %) and agitating for 3 hours, 145 g of acetyl acetone and 200 g of methanol were added so as to prepare the coating composition.

Example 9

The coating composition was prepared by using the titania sol prepared by Example 1.

First, 100 g of tetraethyl orthosilicate, 150 g of 3-glycidyloxypropyl trimethoxysilane, and 100 g of methanol were introduced into a jacket reactor maintaining room temperature. After adding 260 g of the titania sol (solid content: 32 wt %) and agitating for 3 hours, 145 g of acetyl acetone and 200 g of methanol were added so as to prepare the coating composition.

Example 10

The coating composition was prepared by using the titania sol prepared by Example 1.

First, 50 g of tetraethyl orthosilicate, 250 g of 3-glycidyloxypropyl trimethoxysilane, and 100 g of methanol were introduced into a jacket reactor maintaining room temperature. After adding 130 g of the titania sol (solid content: 32 wt %) and agitating for 3 hours, 145 g of acetyl acetone and 200 g of methanol were added so as to prepare the coating composition.

Comparative Example 7

The coating composition was prepared substantially according to the same method as Example 8, except that the titania sol prepared by Comparative Example 1 was used.

The coating composition prepared by Examples 8 to 10 and Comparative 7 were coated on substrates by a wet coating method, dried at 60° C., and then hardened at 120° C. so as to produce the coating layers. The properties of the coating layers were tested according to the following conditions and the results are listed in the following Table 2.

A: Refractive Index (%)

After coating the coating composition on a silicone wafer and then hardening it, the refractive index was measured by using a prism coupler at five different points and the average thereof was calculated.

B: Layer Thickness (μm)

The distance between the valleys of the data obtained by using a prism coupler was measured after coating the coating composition on a silicone wafer and then hardening it.

The layer thickness was calculated from the measured data at five different points and the average thereof was calculated.

C: Abrasion Resistance

Scratches of the coated lens were observed after rubbing the lens 30 times with #0000 steel wool bound to a 1 kg hammer.

⊚: Number of Scratches: 0
○: Number of Scratches: 5 or less of fine scratches of 1 cm or less
Δ: Number of Scratches: more than 5 fine scratches of 1 cm or less, or 1 to 3 long scratches of over 1 cm
x: Number of Scratches: more than 3 long scratches of over 1 cm D: Hot water resistance The coated lens was dipped in boiling water of 100° C. for 10 minutes, and an appearance test was conducted.

⊚: Number of Cracks: 0
○: Number of Cracks: 5 or less of fine cracks of 5 mm or less
Δ: Number of Cracks: more than 5 fine cracks of 5 mm or less, or 1 to 3 long cracks of over 5 mm
x: Number of Cracks: more than 3 long cracks of over 5 mm E: Leveling Property The surface of the coated lens was observed with the naked eye, and projections, troughs, and whether the thickness of the coating layer was uniform were identified.

⊚: Negative Properties 0
x: Negative Properties 1 or more

F: Adhesion Property

According to ASTM D3359, the coating layer was divided into 100 sections of 1 mm×1 mm, and an exfoliation test was conducted by using a cellophane tape of width 24 mm (Japan, Nichban Co.), 10 times. Adhesion property was determined by counting the number of sections that were exfoliated.

⊚: Number Exfoliated: 0
○: Number Exfoliated: 1 to 3
Δ: Number Exfoliated: over 3 and 10 or less
x: Number Exfoliated: over 10

TABLE 2

| Properties | Example 8 | Example 9 | Example 10 | Comparative Example 7 |
|---|---|---|---|---|
| Refractive Index (prism coupler) | 1.59 | 1.60 | 1.55 | 1.48 |
| Layer Thickness (mm) | 2.5 | 2.3 | 2.5 | 2.6 |
| Abrasion Resistance (steel wool #0000, 1 kg, 10 times) | ⊚ | ⊚ | ⊚ | X |
| Hot Water Resistance (boiling water 10 minutes) | ⊚ | ○ | ⊚ | ○ |
| Leveling Property | ○ | ○ | ○ | X |
| Adhesion Property | ○ | ○ | ○ | Δ |

⊚: Very Good,
○: Good,
Δ: Normal,
X: Bad

Referring to Table 2, the coating layers prepared from the coating compositions according to Examples 8 to 10 showed middle to high refractive indexes of 1.55 to 1.60. Furthermore, the abrasion resistance, hot water resistance, leveling, and adhesion properties were much superior to those of Comparative Example 7.

The coating layers prepared from the coating composition according to Examples 8 and 9 showed a high refractive index of 1.59 and 1.60, and the coating layer of Example 10 showed a middle refractive index of 1.55.

On the contrary, the coating layer prepared from the coating composition according to Comparative Example 7 had a refractive index of 1.48, so a desirable refractive index could not be obtained. Furthermore, it can be known that this coating composition is not applicable for the coating layer because the abrasion resistance, leveling property, and adhesion property were very low.

It was possible to prepare a titania sol, in which the mono-dispersed titania was dispersed with a high concentration, by the method of the present invention. The titania sol can comprise the titania dispersed in the solvent for dispersion up to the maximum 50 wt %, and it can be applied as a middle or high refractive filler to a coating layer of glasses, industrial glasses, or goggles for leisure requiring transparency, as a middle or higher refractive filler without a special process.

Although the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing a titania sol, comprising the steps of:
   a) elevating the temperature of a reactant solution in a reactor to a reaction temperature, the reactant solution comprising a precursor of titania in a solvent;
   b) preparing a titania sol by adding an acid catalyst to the reactant solution in an amount of from 13 to 25 parts by weight based on 100 parts by weight of the precursor of titania at the reaction temperature and conducting a sol-gel reaction while simultaneously removing the solvent from the reactor, whereby the conducting step occurs at a temperature of from 70 to 95° C. and under decompression; and
   c) drying the prepared titania sol and re-dispersing the dried titania in a solvent for dispersion,
   wherein the titania sol comprises secondary titania particles having an average diameter of 200 nm or less, and has a solid content of from 8 to 50 wt %, whereby a standard deviation of the diameter of the secondary titania particles does not exceed 0.3.

2. The method according to claim 1, wherein the drying of step c) is conducted at a temperature of 95° C. or less.

3. The method according to claim 2, wherein the drying of step c) is conducted by a method of freeze drying, normal pressure drying, or vacuum drying.

4. The method according to claim 1, wherein the solvent for reaction and the solvent for dispersion are the same or different one or more solvents selected from the group consisting of water, a lower alcohol of $C_1$-$C_5$, a higher alcohol of $C_6$ or more, hexylene glycol, and acetyl acetone.

5. The method according to claim 4, wherein the lower alcohol is methanol, ethanol, propanol, isopropyl alcohol, butyl alcohol, or isobutyl alcohol, and the higher alcohol is a polyvinyl alcohol.

6. The method according to claim 1, wherein the precursor of titania is one or more compounds selected from the group consisting of tetraethoxy titanium, tetraisopropoxy titanium, tetrabutoxy titanium, titanyl chloride, titanyl sulfate, and titanyl oxysulfate.

7. The method according to claim 1, wherein the acid catalyst is one or more compounds selected from the group consisting of nitric acid, sulfuric acid, hydrochloric acid, and acetic acid.

8. The method according to claim 1, wherein one or more inorganic salts selected from the group consisting of NaCl, KCl, NaBr, and KBr, or one or more surfactants selected from the group consisting of sodium dodecyl sulphate, cetyltrimethyl ammonium bromide, and cetyltrimethyl ammonium chloride, is added to the reactant solution in step a).

9. The method according to claim 8, wherein the inorganic salt or the surfactant is added in an amount of from 1 to 10 parts by weight based on 100 parts by weight of the precursor of titania.

10. The method according to claim 1, wherein the secondary titania particles comprise two or more primary titania particles having an average diameter of 1 to 20 nm.

* * * * *